United States Patent
Tanaka et al.

(10) Patent No.: US 8,159,100 B2
(45) Date of Patent: Apr. 17, 2012

(54) INTEGRATED ELECTRONIC COMPRESSOR

(75) Inventors: Masaharu Tanaka, Nagoya (JP); Koji Nakano, Nagoya (JP); Takashi Nakagami, Nagoya (JP); Makoto Hattori, Kiyosu (JP); Takayuki Takashige, Kiyosu (JP); Kazuki Niwa, Kiyosu (JP); Hiroyuki Kamitani, Kiyosu (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 95 days.

(21) Appl. No.: 12/439,668

(22) PCT Filed: Sep. 28, 2007

(86) PCT No.: PCT/JP2007/069094
§ 371 (c)(1),
(2), (4) Date: Mar. 2, 2009

(87) PCT Pub. No.: WO2008/108019
PCT Pub. Date: Sep. 12, 2008

(65) Prior Publication Data
US 2010/0018243 A1 Jan. 28, 2010

(30) Foreign Application Priority Data
Mar. 6, 2007 (JP) ................................ 2007-055209

(51) Int. Cl.
*H02K 7/10* (2006.01)
*H02K 11/00* (2006.01)
*B60H 1/32* (2006.01)
*F04B 17/00* (2006.01)

(52) U.S. Cl. ......... 310/75 R; 310/68 R; 310/72; 62/244; 417/410.1

(58) Field of Classification Search ................ 310/68 R, 310/72, 75 R; 62/244, 508; 417/410.1
See application file for complete search history.

(56) References Cited

U.S. PATENT DOCUMENTS
2,659,843 A * 11/1953 Mcnicol ........................ 361/608
(Continued)

FOREIGN PATENT DOCUMENTS
JP 3086819 B2 9/2000
(Continued)

OTHER PUBLICATIONS
Machine Translation JP2004225580 (2004).*
(Continued)

*Primary Examiner* — Quyen Leung
*Assistant Examiner* — Jose Gonzalez Quinones
(74) *Attorney, Agent, or Firm* — Westerman, Hattori, Daniels & Adrian, LLP

(57) ABSTRACT

There is provided an integrated electric compressor that is improved in reliability. Bus bar connection is employed for electrical connection between a power board 16 and the power source side and between the power board 16 and the motor side, and welding is employed for joining a bus bar to a capacitor 13 and a reactor 14, for joining board-side terminal parts of the bus bar to PN terminals 20a and 20b, and for joining UVW terminals 25a, 25b and 25c to housing-side terminals 28a, 28b and 28c. By employing resistance welding for the welding, the terminals can be joined to each other with stabilized quality. Further, since flat joint plates are provided on one end side of the housing-side terminals 28a, 28b and 28c, and the UVW terminals 25a, 25b and 25c are welded thereto, reliable joints between terminals can also be attained in these portions.

8 Claims, 8 Drawing Sheets

U.S. PATENT DOCUMENTS

| | | | |
|---|---|---|---|
| 6,354,674 B1 * | 3/2002 | Iwamoto et al. | 303/119.3 |
| 2002/0034087 A1 | 3/2002 | Suzuki et al. | |
| 2003/0200761 A1 * | 10/2003 | Funahashi et al. | 62/228.4 |
| 2004/0043647 A1 * | 3/2004 | Takeuchi | 439/76.2 |
| 2005/0167183 A1 * | 8/2005 | Tominaga et al. | 180/444 |
| 2006/0258199 A1 * | 11/2006 | Umehara et al. | 439/247 |

FOREIGN PATENT DOCUMENTS

| | | |
|---|---|---|
| JP | 2002-095268 A | 3/2002 |
| JP | 2003-299366 A | 10/2003 |
| JP | 2003-324903 A | 11/2003 |
| JP | 2004-032901 A | 1/2004 |
| JP | 2004-225580 A | 8/2004 |
| JP | 2004225580 A * | 8/2004 |

OTHER PUBLICATIONS

Chinese Office Action dated May 6, 2011, issued in corresponding Chinese Patent Application No. 200780048983.4.

Chinese Office Action dated Aug. 30, 2010, issued in corresponding Chinese Patent Application No. 200780048983.4.

* cited by examiner

INTEGRATED ELECTRONIC COMPRESSOR

TECHNICAL FIELD

The present invention relates to an integrated electric compressor constituting an on-vehicle air conditioner.

BACKGROUND ART

In recent years, there has been provided an integrated electric compressor in which a compressor constituting an on-vehicle air conditioner, a motor for driving the compressor, and a driving board for driving the motor are accommodated integrally in a housing (for example, refer to Patent Document 1).
Patent Document 1: Japanese Patent No. 3086819

DISCLOSURE OF THE INVENTION

Problems to be Solved by the Invention

Though not limited to such an integrated electric compressor, on-vehicle equipment is placed under heat and vibration conditions far severer than those of equipment in other fields. In the integrated electric compressor, a driving board mounted with electrical and electronic parts is accommodated in a housing together with a compressor and a motor, so that improvement in reliability especially of the driving board is required.

As well known, to attach and mount the electrical and electronic parts onto the board, soldering or screwing are often employed. However, the soldering and screwing have a problem in that the solder may be cracked or the screw may be loosened by repeated vibrations and heat changes. If the solder is cracked or the screw is loosened, the electrical continuity is impaired, and there arises a possibility that a predetermined function cannot be performed.

Also, in soldering or screw tightening, variations between workers may occur, which provides room for improvement in reliability.

The present invention has been accomplished to solve the above technical problems, and accordingly an object thereof is to provide an integrated electric compressor which can be improved in reliability.

Means for Solving the Problems

An integrated electric compressor of the present invention accomplished to achieve the above object includes a compressor constituting an air conditioner; a polyphase motor for driving the compressor; a control board for operating the polyphase motor by controlling a current supplied from a power source to each phase of the polyphase motor; and a housing for accommodating the compressor, the polyphase motor, and the control board. The number of phases of the polyphase motor is not subject to any special restriction. Generally, however, a three-phase motor is often used. In such an integrated electric compressor, it is preferable that wires that are provided between the control board and the polyphase motor to supply a current to each phase of the polyphase motor from the control board be formed by a bus bar. By using the bus bar for electrical connection between the control board and the polyphase motor in this manner, the bus bar and a terminal on the polyphase motor side can be joined to each other by resistance welding or the like. In resistance welding, if a welding current value and the like are controlled, the welding conditions can easily be kept constant, whereby the bus bar can be joined to the terminal with stabilized quality.

Also, it is preferable that the bus bars corresponding to the number of phases of the polyphase motor be integrated by an insulator, and the insulator be provided with a positioning means for performing positioning with respect to the control board. By integrating the bus bars corresponding to the number of phases of the polyphase motor by using the insulator as described above, the bus bars can be handled as a unit, so that the assembling workability is improved.

Further, by providing the insulator with the positioning means for performing positioning with respect to the control board, the assembling workability is further improved. As the positioning means, pins, protrusions, or the like can be used.

In the case where the bus bar has a rectangular cross section, it is preferable that a flat joint plate be provided in the distal end part of the terminal on the polyphase motor side to join the joint plate and the bus bar to each other. Thereby, the joining of the bus bar to the terminal by means of welding can be performed reliably and easily.

Also, it is preferable that a wire for applying a voltage to the control board from the power source be also formed by a bus bar.

In the case where a capacitor and a reactor for stabilizing the voltage supplied from the power source are provided between the power source and the control board, it is preferable that the capacitor and the reactor be connected to the power source side and the control board by the bus bar. Thereby, the capacitor, the reactor, and the bus bar can be unitized, which also leads to the improvement in assembling workability.

Such an integrated electric compressor can be used as on-vehicle equipment.

Advantages of the Invention

According to the present invention, since the bus bar connection is employed for electrical connection between the control board and the motor side, and welding is further employed for the connection between the bus bar and the terminal, the reliability of joint between the terminals can be enhanced.

Also, since resistance welding is employed for the welding, variations between workers are less liable to occur, so that the terminals can be joined to each other with stabilized quality.

DESCRIPTION OF SYMBOLS

10 ... electric compressor (integrated electric compressor), 11 ... housing, 12 ... inverter board (control board), 13 ... capacitor, 14 ... reactor, 15 ... control circuit board, 16 ... power board, 18 ... switching element, 19 ... motor (polyphase motor), 19a, 19b, 19c ... connecting terminal, 20 ... input/output terminal, 20a, 20b ... PN terminal, 23 ... bus bar (wire for applying a voltage to the control board), 23a, 23b ... power source-side terminal part, 23c, 23d ... board-side terminal part, 23e ... capacitor-side terminal part, 23f ... reactor-side terminal part, 23g ... joint part, 24 ... resin body, 25a, 25b, 25c ... UVW terminal (wire for supplying a current to each phase of the polyphase motor), 26 ... resin body (insulator), 27a, 27b ... protrusion (positioning means), 28a, 28b, 28c ... housing-side terminal (terminal on the polyphase motor side), 28d ... base, 30, 40 ... bus bar unit, 31a, 31b, 31c ... joint plate

BEST MODE FOR CARRYING OUT THE INVENTION

The present invention will now be described in detail based on an embodiment shown in the accompanying drawings.

Figure 1:
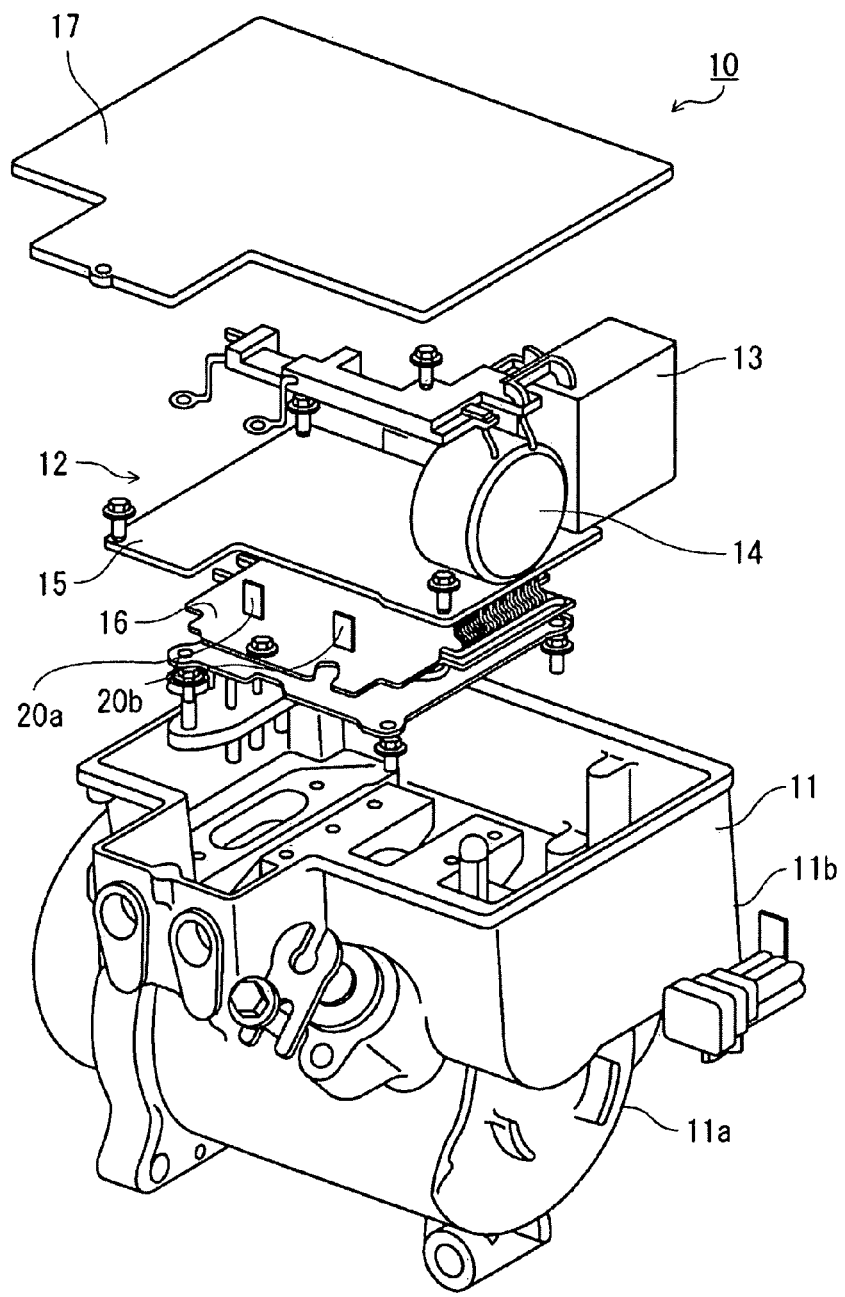
FIG. 1 is an exploded perspective view showing a general configuration of an electric compressor in accordance with an embodiment.

FIG. 1 is an exploded perspective view showing a configuration of an electric compressor (integrated electric compressor) 10 of this embodiment.

As shown in FIG. 1, for an electric compressor 10, a motor (not shown) and a scroll compressor (not shown) are accommodated in a lower accommodation chamber 11a of a housing 11, and an inverter board (control board) 12 is accommodated in an upper accommodation chamber 11b, which is open upward, of the housing 11. The upward opening of the upper accommodation chamber 11b of the housing 11 is covered with a cover 17.

The inverter board 12 includes a capacitor 13 and a reactor 14, which are used for smoothing a direct current voltage supplied to the inverter board 12, a control circuit board 15 for controlling the application of a high-voltage alternating current to the motor, and a power board 16 for converting a direct current supplied from a high-voltage power source to an alternating current and applying the alternating current to the motor to rotationally drive the motor.

Figure 2:
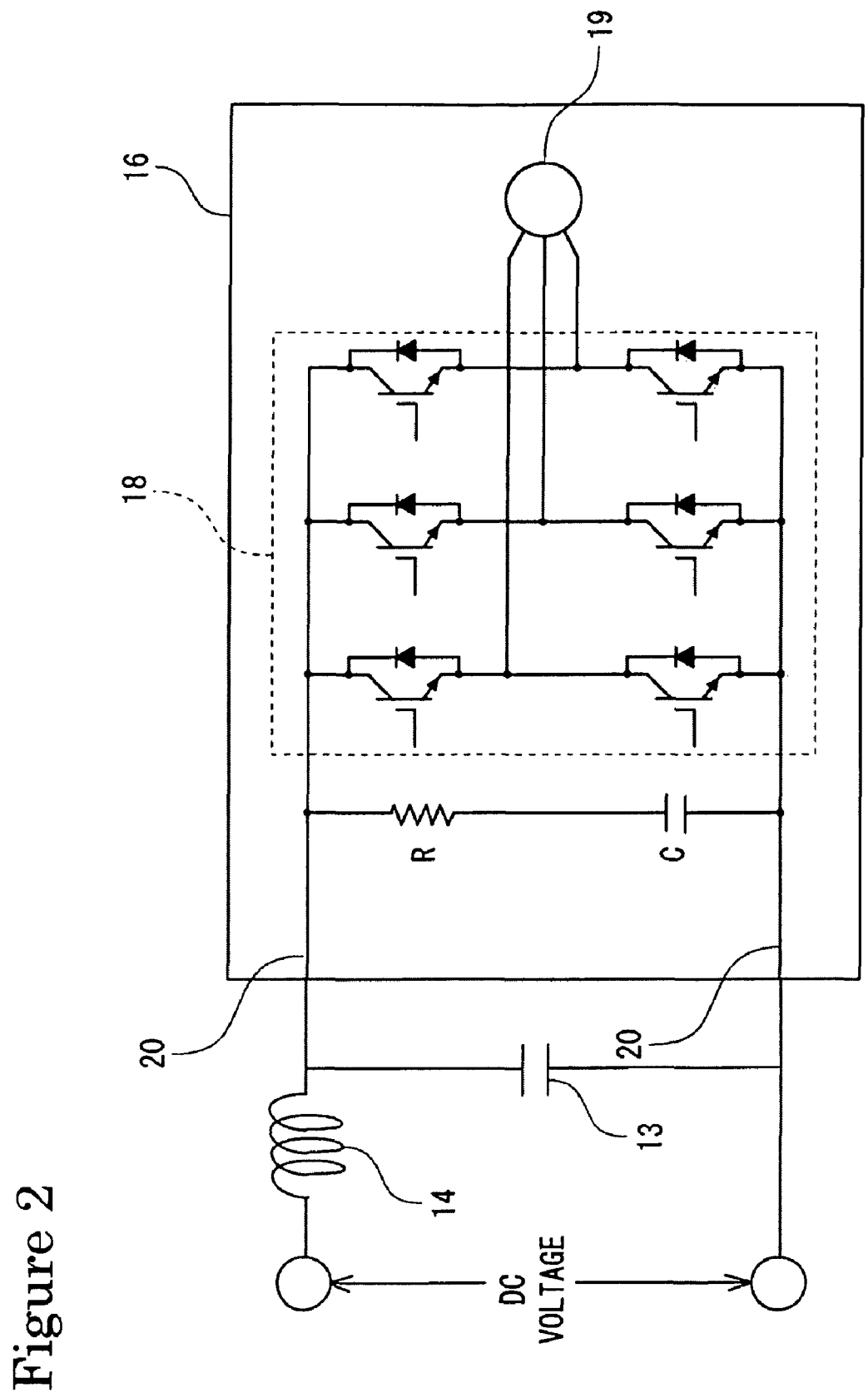
FIG. 2 is a diagram showing a circuit configuration of a power board.

FIG. 2 is a diagram showing a circuit configuration of the power board 16. As shown in FIG. 2, to the power board 16, a high voltage, for example, as high as 300 V is supplied from an external high-voltage power source (not shown). On the power board 16, a switching element 18 formed by a plurality of IGBTs is mounted. On the control circuit board 15, a microcomputer for controlling the operation of the switching element 18 and a gate circuit (both of the two not shown) are provided. The gate circuit is driven by the control of the microcomputer, and the drive signal thereof is transmitted from the control circuit board 15 to the power board 16 and is input to the switching element 18, by which the switching element 18 is operated. Thereby, the high voltage supplied from the high-voltage power source is applied to the motor (polyphase motor) 19 of the electric compressor 10 as a three-phase alternating current, by which the motor 19 is rotationally driven.

Figure 3:
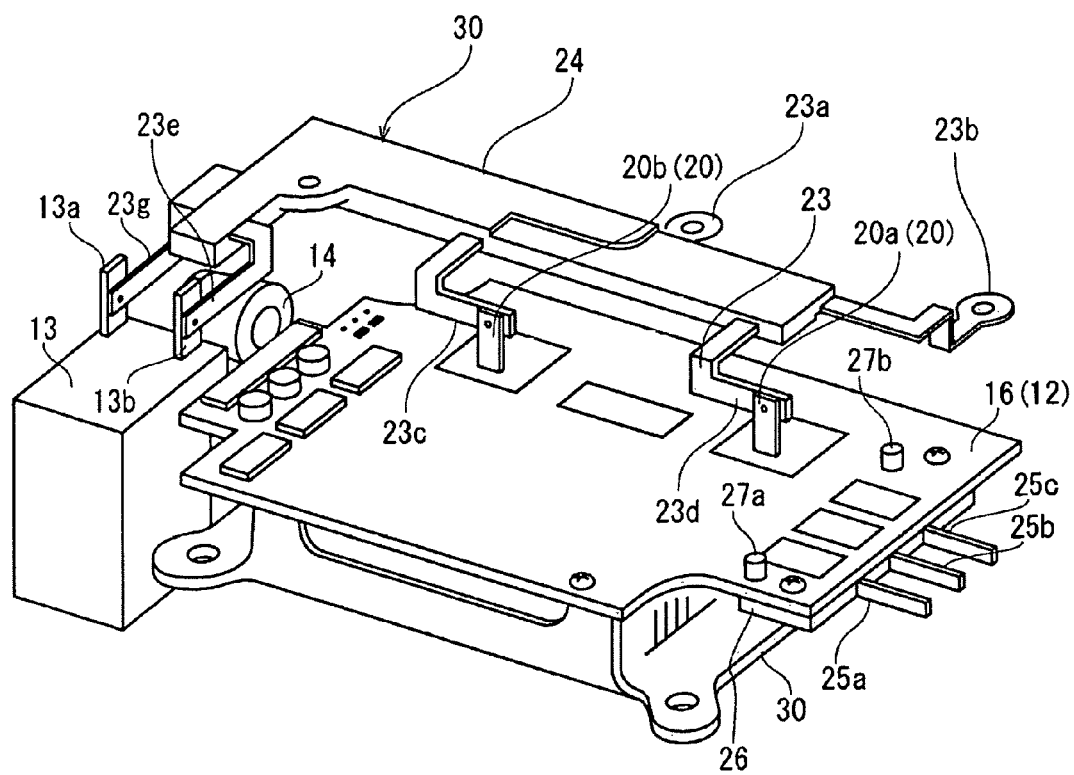
FIG. 3 is a perspective view showing a configuration for supplying electric power from a power source to a power board by using a bus bar.

In the above-described circuit configuration, power is supplied from the high-voltage power source to the power board 16 via input/output terminals 20. As shown in FIGS. 1 and 3, the input/output terminals 20 are formed by pin-shaped PN terminals 20a and 20b mounted on the power board 16.

The electrical continuity to the PN terminals 20a and 20b is made by the connection of a bus bar (wire for applying a voltage to the control board) 23 from the high-voltage power source side.

Figure 4:
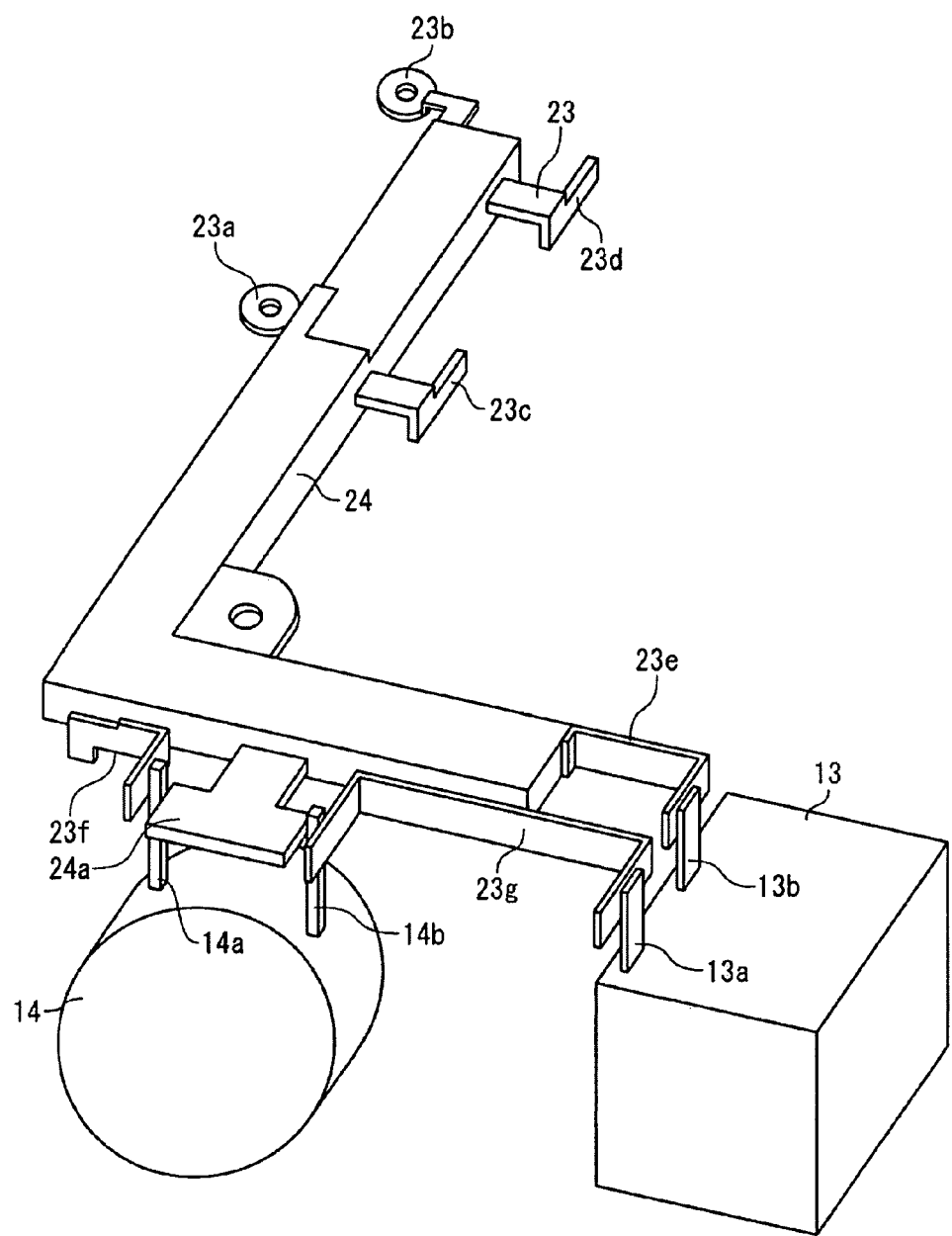
FIG. 4 is a perspective view showing a unit consisting of a capacitor, a reactor, and a bus bar.

As shown in FIGS. 3 and 4, with the bus bar 23, the capacitor 13 and the reactor 14 are unitized integrally. Specifically, the bus bar 23 has power source-side terminal parts 23a and 23b connected to the high-voltage power source side, board-side terminal parts 23c and 23d connected to the PN terminals 20a and 20b, a capacitor-side terminal part 23e connected to a terminal 13b of the capacitor 13, a reactor-side terminal part 23f connected to a terminal 14a of the reactor 14, and a joint part 23g that connects a terminal 13a of the capacitor 13 and a terminal 14b of the reactor 14 to each other, and the capacitor 13 and the reactor 14 are connected to each other by the bus bar 23 so as to provide a circuit configuration as shown in FIG. 2. The bus bar 23 can be made of copper having a cross-sectional dimension of, for example, about 5 mm×1 mm.

The bus bar 23 excluding the terminal parts is coated with a resin body 24. The resin body 24 is formed with a substantially T-shaped support part 24a so as to reinforce a connecting part between the terminals 14a and 14b of the reactor 14 and the reactor-side terminal part 23f and the joint part 23g of the bus bar 23.

The resin body 24 functions not only as an insulator for preventing short-circuit of bus bar 23 but also as a reinforcement for the bus bar 23. Thereby, the bus bar 23, the capacitor 13, and the reactor 14 can be handled as an integrated bus bar unit 30.

To the capacitor-side terminal part 23e, the reactor-side terminal part 23f, and the joint part 23g of the bus bar 23, the capacitor 13 and the reactor 14 have been welded in advance. The board-side terminal parts 23c and 23d of the bus bar 23 are welded to the PN terminals 20a and 20b when the inverter board 12 is assembled.

The welding of the board-side terminal parts 23c and 23d of the bus bar 23 to the PN terminals 20a and 20b, and the welding of the capacitor-side terminal part 23e, the reactor-side terminal part 23f, and the joint part 23g to the capacitor 13 and the reactor 14 are performed, for example, by resistance welding. Besides the resistance welding, for example, spot welding can also be performed. In the case where spot welding is performed, it is preferable that the surrounding board have been covered with a cover or the like to prevent the influence of spark from extending to the surroundings during spot welding.

Figure 5:
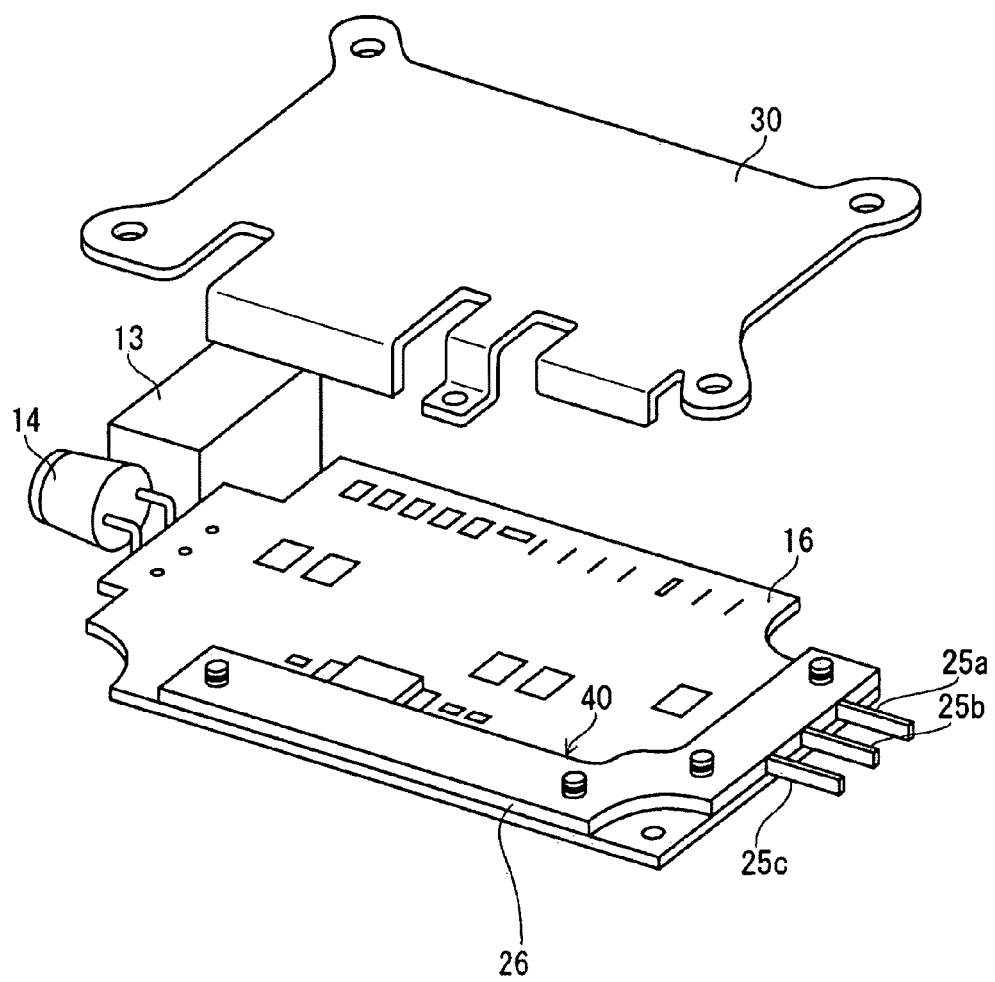
FIG. 5 is a perspective view showing an example in which a UVW terminal for connecting a switching element and a motor to each other is configured by a bus bar.

Also, on the power board 16, the PN terminals 20a and 20b each are formed by a bus bar. The power board 16 is provided with UVW terminals (wires for supplying a current to each phase of the polyphase motor) 25a, 25b and 25c for connecting the switching element 18 to the motor 19, and these UVW terminals 25a, 25b and 25c each are also formed by a bus bar. As shown in FIG. 5, the PN terminals 20a and 20b and the UVW terminals 25a, 25b and 25c are integrated while being insulated from each other by a resin body (insulator) 26 thereby forming a bus bar unit 40.

The resin body 26 is provided on the surface opposite to the side on which the bus bar 23 is located with respect to the power board 16. As shown in FIG. 3, the PN terminals 20a and 20b the proximal end parts of which are held by the resin body 26 are provided so that the distal end parts thereof project to the side on which the bus bar 23 is located through openings formed in the power board 16.

Also the resin body 26 is formed with protrusions (positioning means) 27a and 27b in the vicinity of the UVW terminals 25a, 25b and 25c. The power board 16 is formed with holes at positions corresponding to the protrusions 27a and 27b, so that the protrusions 27a and 27b are inserted into these holes. By these protrusions 27a and 27b, the positioning of a bus bar unit 40 with respect to the power board 16 can be performed easily and reliably.

Figure 6:
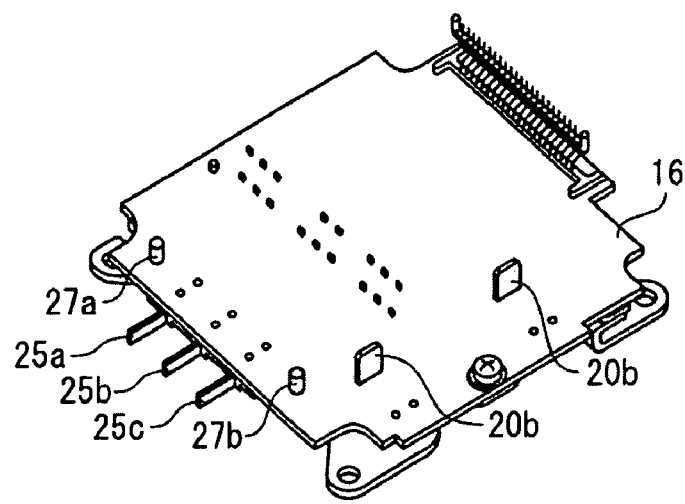
FIG. 6 is a perspective view showing the relationship between a UVW terminal on the power board side and a terminal on the housing side.
Figure 6:
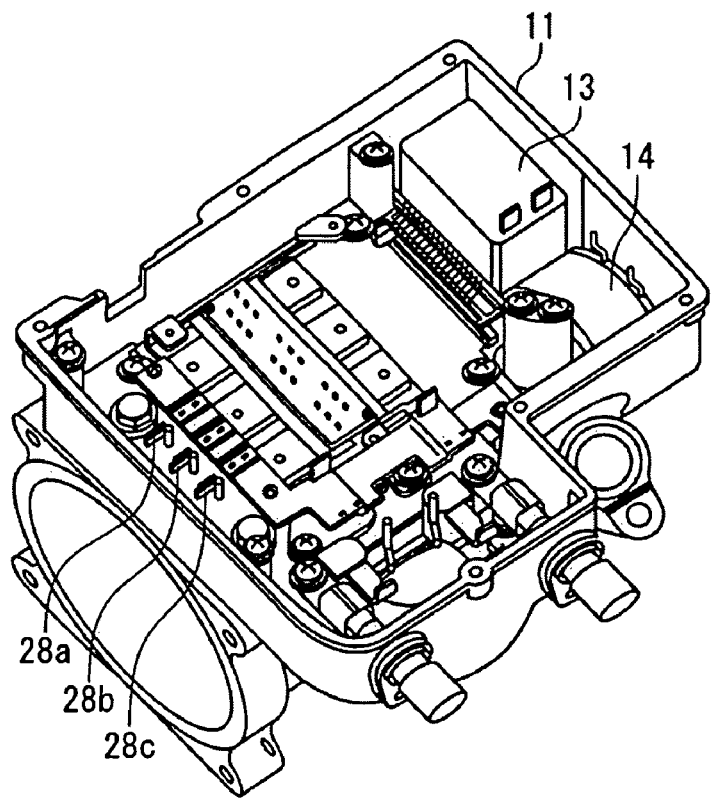
Figure 7:
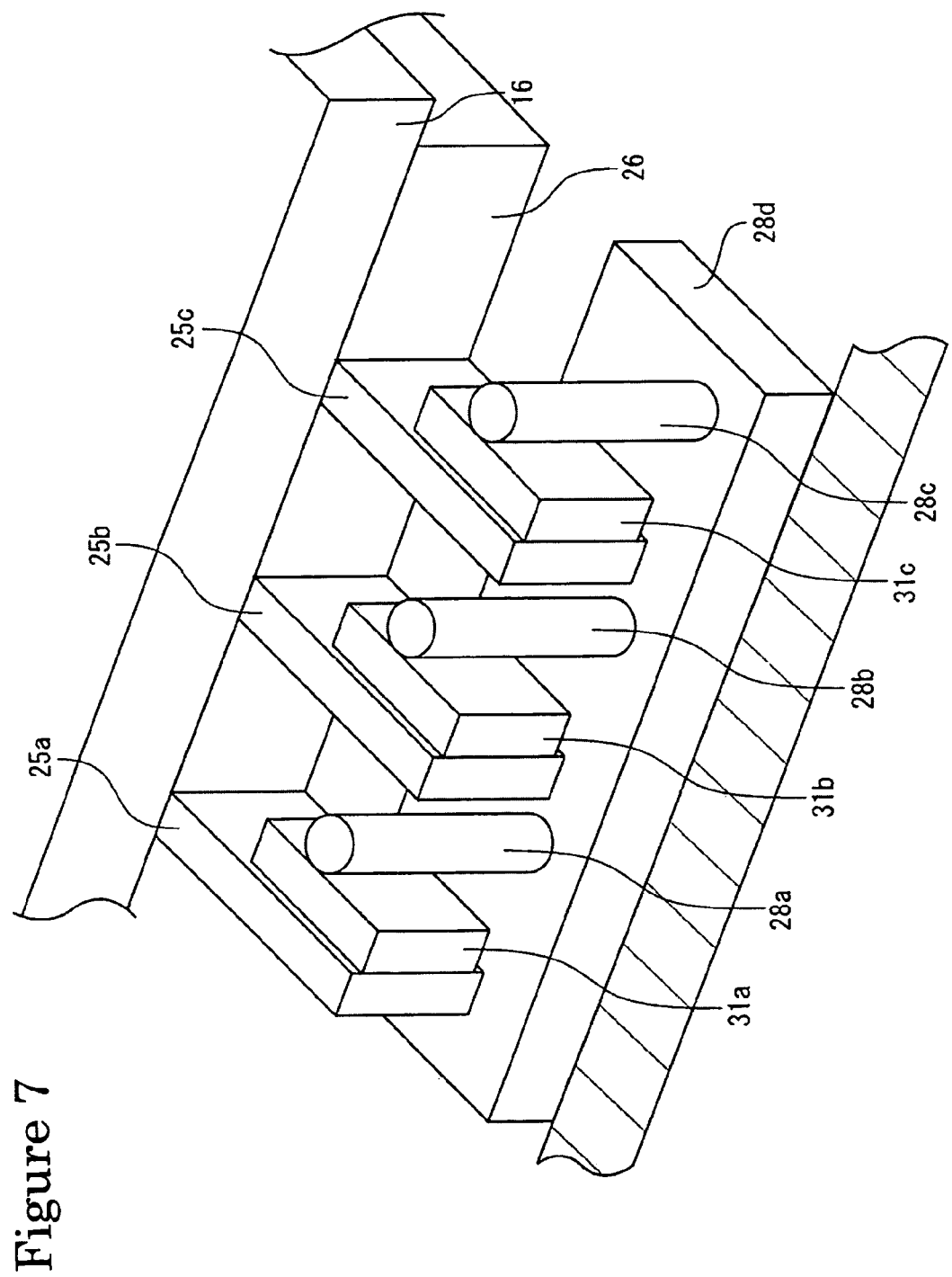
FIG. 7 is a perspective view showing a state in which a UVW terminal on the power board side and a terminal on the housing side are joined to each other.
Figure 8:
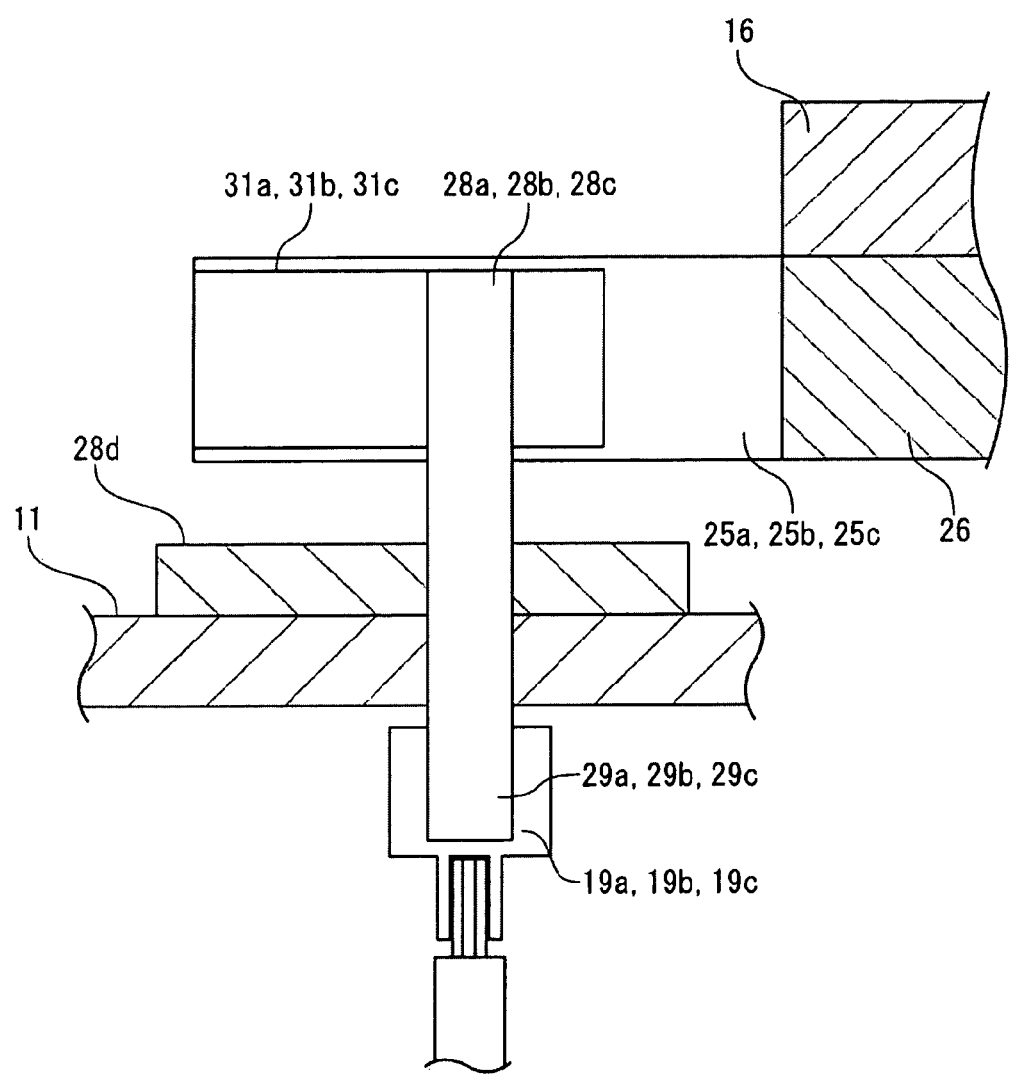
FIG. 8 is a sectional view of FIG. 7.

As shown in FIGS. 6 and 7, on the housing 11 side, there are provided housing-side terminals (terminals on the polyphase motor side) 28a, 28b and 28c that are connected to the UVW terminals 25a, 25b and 25c. As shown in FIG. 8, the housing-side terminals 28a, 28b and 28c are connected with the UVW terminals 25a, 25b and 25c on one end side thereof, and are provided with connecting terminals 29a, 29b and 29c on the other end side thereof. To these connecting terminals 29a, 29b and 29c, connecting terminals 19a, 19b and 19c of the motor 19 are fitted.

The housing-side terminals 28a, 28b and 28c are integrated by a base 28d consisting of an insulator such as a glass-based material, and the base 28d is fixed to the housing 11 with screws or the like.

The housing-side terminals 28a, 28b and 28c each have a pin shape, and on one end side thereof to which the UVW terminals 25a, 25b and 25c are connected, flat joint plates 31a, 31b and 31c are provided integrally by welding or the like. The joint plates 31a, 31b and 31c are joined to the UVW terminals 25a, 25b and 25c by resistance welding or the like.

Thus, bus bar connection is employed for electrical connection between the power board 16 and the power source side and between the power board 16 and the motor 19 side, and welding is employed for joining the bus bar 23 to the capacitor 13 and the reactor 14, for joining the board-side terminal parts 23c and 23d of the bus bar 23 to the PN terminals 20a and 20b, and for joining the UVW terminals 25a, 25b and 25c to the housing-side terminals 28a, 28b and 28c. The welding is less liable to develop cracks etc. than soldering and screwing, whereby the reliability of joint between the terminals can be enhanced.

Also, by employing resistance welding or spot welding for the welding, variations between workers can be made less liable to occur by controlling a welding current value and the like, and thereby the terminals can be joined to each other with stabilized quality.

Further, since the flat joint plates 31a, 31b and 31c are provided on one end side of the housing-side terminals 28a, 28b and 28c, and the UVW terminals 25a, 25b and 25c are welded thereto, reliable joints between terminals can also be attained in these portions by the welding between planes.

Also, since the terminal group connected to the power board 16 is unitized by the bus bar units 30 and 40, the assembling workability of the inverter board 12 is also improved. Since, in the bus bar unit 40, the protrusions 27a and 27b are provided on the resin body 26, and the positioning with respect to the power board 16 is performed by using the protrusions 27a and 27b, the assembling workability is improved in this respect as well.

In the above-described embodiment, the shapes and constructions of parts of the electric compressor 10, the configuration of the inverter board 12, and the like have been explained. However, the present invention is not limited to the above-described configurations.

The configurations described in the above embodiment can be selected or can be changed appropriately without departing from the spirit and scope of the present invention.

The invention claimed is:

1. An integrated electric compressor comprising:
a compressor constituting an air conditioner;
a polyphase motor for driving the compressor;
a control board for operating the polyphase motor by controlling a current supplied from a power source to each phase of the polyphase motor; and
a housing for accommodating the compressor, the polyphase motor, and the control board, characterized in that
wires which are provided between the control board and the polyphase motor to supply a current to each phase of the polyphase motor from the control board are formed by a bus bar; the bus bars corresponding to the number of phases of the polyphase motor are integrated by an insulator; and the insulator is provided with a positioning means for performing positioning with respect to the control board,
wherein the bus bar has a rectangular cross section, and
a plurality of flat joint plates corresponding to the number of phases of the polyphase motor are provided in the distal end part of the terminal on the polyphase motor side, whereby each joint plate and the corresponding bus bar are jointed to each other by welding.

2. The integrated electric compressor according to claim 1, characterized in that the bus bar and a terminal on the polyphase motor side are joined to each other by resistance welding.

3. The integrated electric compressor according to claim 1, characterized in that a wire for applying a voltage to the control board from the power source is formed by a bus bar.

4. The integrated electric compressor according to claim 3, characterized in that a capacitor and a reactor for stabilizing the voltage supplied from the power source are provided between the power source and the control board, and the capacitor and the reactor are connected to the power source side and the control board by the bus bar.

5. The integrated electric compressor according to claim 1, characterized in that the integrated electric compressor is mounted on a vehicle.

6. The integrated electric compressor according to claim 1, wherein the control board comprises a power board for converting a direct current supplied from the power source to an alternative current and applying the alternative current to the polyphase motor to rotationally drive the motor, and a control circuit board for controlling the application of the alternative current to the polyphase motor, and the positioning means performs positioning with respect to the power board.

7. The integrated electric compressor according to claim 6, wherein a wire for applying a voltage to the power board from the power source is formed by a bus bar.

8. The integrated electric compressor according to claim 7, wherein the control board comprises a capacitor and a reactor for stabilizing the voltage supplied from the power source, and the capacitor and the reactor are connected to the power source side by the bus bar.

* * * * *